US009904926B2

(12) United States Patent
Mahajan et al.

(10) Patent No.: US 9,904,926 B2
(45) Date of Patent: Feb. 27, 2018

(54) REDUCING OVERHEAD ASSOCIATED WITH LARGE-SCALE PURCHASING

(75) Inventors: Nilesh Mahajan, Sunnyvale, CA (US); Srinivasa Pasupulati, Cupertino, CA (US); Niccolas Conlin, Eagle Mountain, UT (US)

(73) Assignee: eBay Inc., San Jose, CA (US)

( * ) Notice: Subject to any disclaimer, the term of this patent is extended or adjusted under 35 U.S.C. 154(b) by 647 days.

(21) Appl. No.: 13/601,603

(22) Filed: Aug. 31, 2012

(65) Prior Publication Data
US 2014/0067600 A1  Mar. 6, 2014

(51) Int. Cl.
G06Q 30/00  (2012.01)
G06Q 30/02  (2012.01)
G06Q 30/06  (2012.01)
G06Q 30/08  (2012.01)

(52) U.S. Cl.
CPC ............ *G06Q 30/00* (2013.01); *G06Q 30/02* (2013.01); *G06Q 30/0601* (2013.01); *G06Q 30/08* (2013.01)

(58) Field of Classification Search
CPC ....................... H04N 2201/3218; G06Q 20/12
USPC ................................................ 705/26.1, 27.1
See application file for complete search history.

(56) References Cited

U.S. PATENT DOCUMENTS

| 2007/0095904 | A1  | 5/2007  | Barta et al. |
| 2009/0138398 | A1* | 5/2009  | Cole et al. ...................... 705/42 |
| 2010/0088175 | A1  | 4/2010  | Lundquist |
| 2010/0332284 | A1  | 12/2010 | Hilbush et al. |
| 2011/0208649 | A1  | 8/2011  | Shader et al. |
| 2012/0084222 | A1* | 4/2012  | Zimberoff et al. ............ 705/330 |
| 2012/0109734 | A1* | 5/2012  | Fordyce et al. ............ 705/14.25 |

FOREIGN PATENT DOCUMENTS

WO   WO-2014036141 A1   3/2014

OTHER PUBLICATIONS

Messer, Ellen "Open Market to debute e-comm tools," Network World, 12, Mar. 27, 2000.*
"International Application Serial No. PCT/US2013/057084, International Preliminary Report on Patentability dated Mar. 12, 2015", 6 pgs.
"International Application Serial No. PCT/US2013/057084, International Search Report dated Dec. 6, 2013", 2 pgs.
"International Application Serial No. PCT/US2013/057084, Written Opinion dated Dec. 6, 2013", 4 pgs.

* cited by examiner

*Primary Examiner* — Brandy A Zukanovich
(74) *Attorney, Agent, or Firm* — Schwegman Lundberg & Woessner, P.A.

(57) ABSTRACT

A method of verifying a receiving of an item by a purchaser is disclosed. An indication that the purchaser agreed to purchase the item is received. A record is added to a purchase history associated with the purchaser, the record including a data item pertaining to the purchasing of the item. A notification that the purchaser has scanned information from a label on a package is received. It is determined that the package contains the item based on a correspondence between the data item and the information from the label. The record is updated to include verification data that the purchaser received the item.

20 Claims, 9 Drawing Sheets

REDUCING OVERHEAD ASSOCIATED WITH LARGE-SCALE PURCHASING

TECHNICAL FIELD

The present application relates generally to the technical field of internet commerce, and, in one specific example, to enabling large-scale purchasers to manage their purchasing more efficiently, particularly with respect to their tracking of purchases received and their managing of disputes related to their purchases.

BACKGROUND

Various network-based publication systems (e.g., EBAY®, AMAZON®, or CRAIGSLIST®) may facilitate the buying or selling of items (e.g., goods or services) by their users. Additionally, these systems, may keep track of and enable users to view or perform actions with respect to their past actions on these systems. For example, these systems may enable a user to view his purchase history. The purchase history may include a listing of items that the user has purchased (e.g., over a particular period of time, such as a month or year). Each record or entry in the listing may include various information about a purchased item, such as a description, a purchase price, a date of purchase, information about the seller (e.g., user name, feedback rating, and so on), a cost of shipping for the item, and so on. Furthermore, each entry may be associated with actions that the user can perform with respect to a past purchase, such as viewing a seller's other items, viewing similar listed items, listing the purchased stem for sale, contacting the seller, and so on. However, traditional methods of enabling users to view and manage actions associated with their past purchases may not take into account various needs of large-scale buyers (e.g., a buyer who purchases a significantly larger number of items in a given rime period than a typical user).

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

Consistent with various embodiments, a method of verifying a receiving of an item by a purchaser is disclosed. An indication, that the purchaser agreed to purchase the item is received. A record is added to a purchase history associated with the purchaser, the record including a data item pertaining to the purchasing of the item. A notification that the purchaser has scanned information from a label on a package is received. If is determined that the package contains the item based on a correspondence between the data item and the information from the label. The record is updated to include verification data that the purchaser received the item.

This method and the various embodiments disclosed herein may be implemented as a computer system having one or more modules (e.g., hardware modules or software modules). This method and the various embodiments disclosed herein may be embodied as instructions stored on a machine-readable medium that, when executed by a processor, cause the processor to perform the method.

Figure 1:
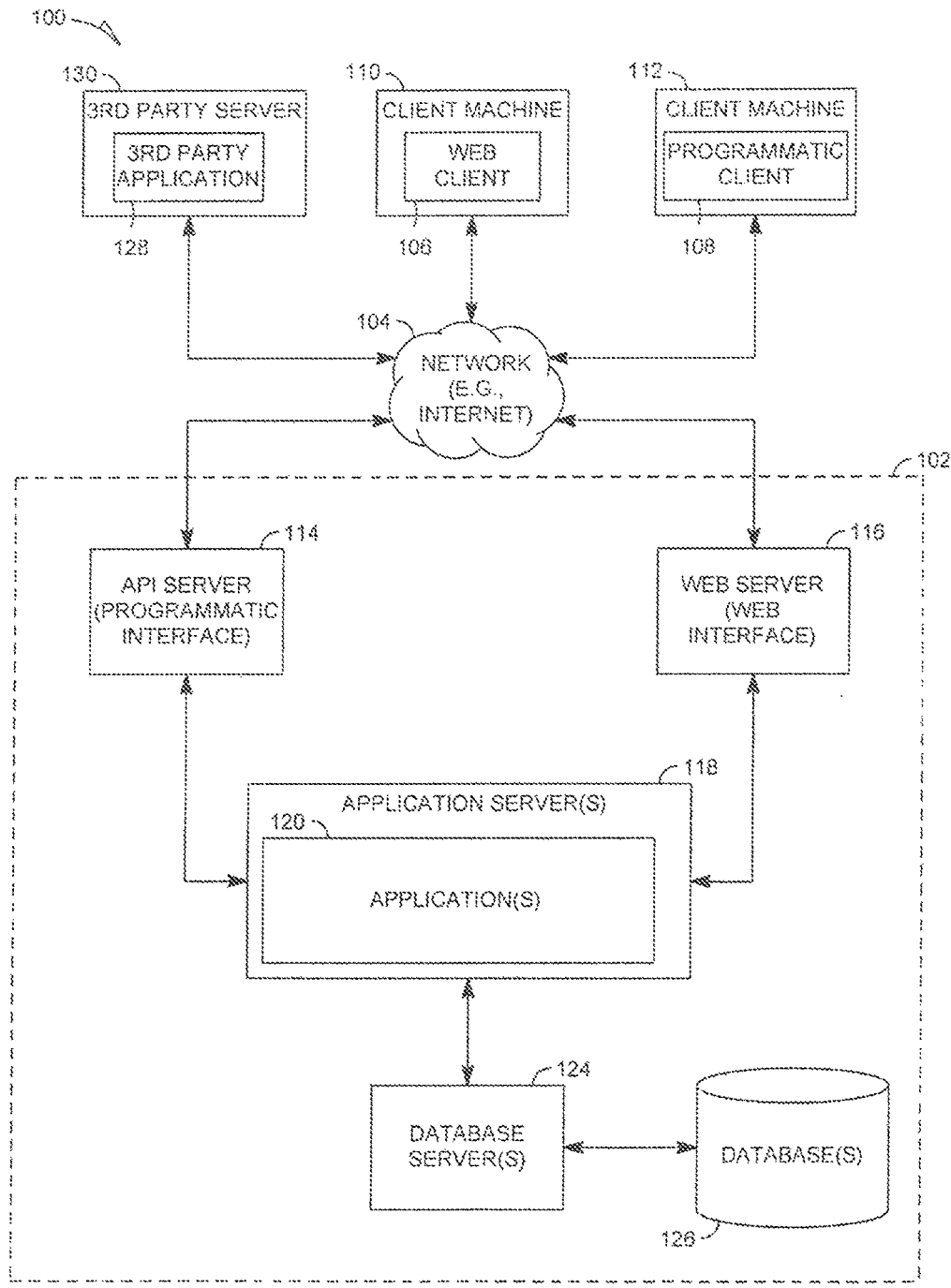
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients may include a software application module (e.g., a plug-in, add-in, or macro) that adds a specific service or feature to a larger system. The software application module may be separate from but tightly-integrated into a user interface and functionality of a software application, such as a spreadsheet application. The software application may be a client software application executing on a chest machine. The software application module may be optionally deployed in the same environment as the software application such that the software application module can be accessed from within the software application. The software application module may be optionally enabled or disabled within the environment (e.g., user interface) of the software application. The software application module may appear to be a part of the software application by, for example, providing user interface components or widgets (e.g., menus, toolbars, menu commands, toolbar commands, and so on) that can be enabled, disabled, added to, or removed from, standard user interface components or widgets provided by the software application.

An API server 114 and a web server 116 are coupled to, and provide programmatic and web interfaces respectively to, one or more application servers 118. The application servers 118 host one or more applications) 120. The application servers 118 are, in turn, shown, to be coupled to one or more database servers 124 that facilitate access to one or more NoSQL or non-relational data stores or databases 126.

The marketplace applications 120 may provide a number of marketplace functions and services to users that access the networked system 102. While the applications 126 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various applications 120 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the application 128, 106, and 108 may be coupled to applications 120, such as payment applications associated with multiple payment processors (e.g., Visa, MasterCard, and American Express).

The web client 106 accesses the various applications 120 via the web interface supported by the web server 116. Similarly, the programmatic client 108 accesses die various services and functions provided by the applications 120 via the programmatic interface provided by the API server 114. The programmatic client 108 may, for example, be a seller application (e.g. the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third-party application 128, executing on a third-party server machine 130 as having programmatic access to the networked system 102 via the programmatic interface provided by the API server 114. For example, the third-party application 128 may, utilizing information retrieved from the networked system 102, support one or more features or functions on a website hosted by the third party. The thud-party website may, for example, provide one or more promotional, marketplace or payment functions that are supported by the relevant applications of the networked system 102.

Figure 2:
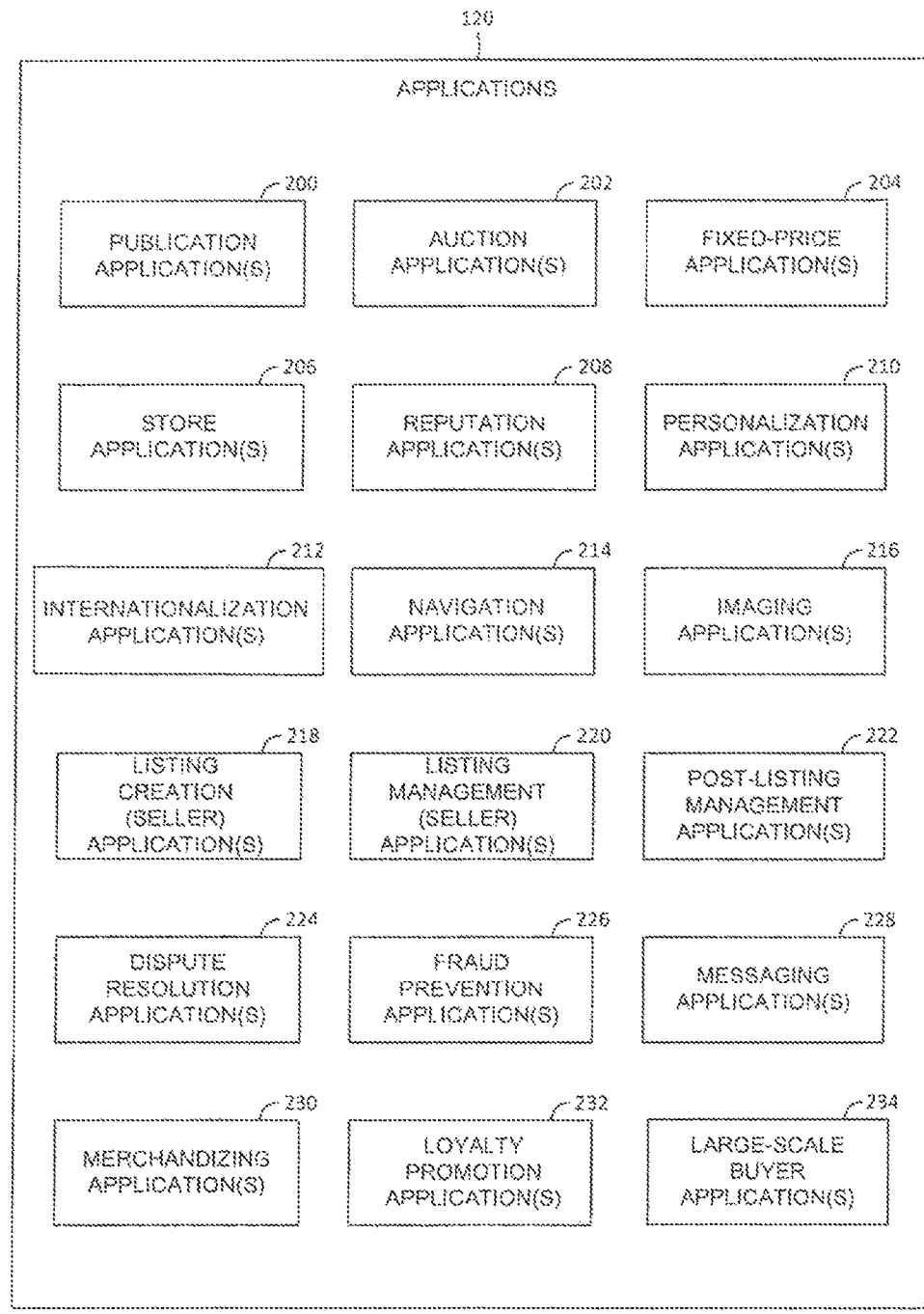
FIG. 2 is a block diagram illustrating multiple, applications including large-scale buyer applications that, in various example embodiments, are provided as part of the networked system of FIG. 1.

FIG. 2 is a block diagram illustrating multiple applications 120 that, in various example embodiments, are provided as part of the networked system 102. The applications 120 may be hosted on dedicated or shared server machines (not shown) that are communicatively coupled to enable communications between server machines. The applications 120 themselves are communicatively coupled (e.g., via appropriate interfaces) to each other and to various data sources, so as to allow information to be passed between the applications 120 so as to allow the applications 120 to share and access common data. The applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features, in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published in potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings, and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support, the customization of information for a number of regional websites that are operated by the networked system 102 and that are accessible via respective web servers 116.

Navigation of the networked system 102 may be facilitated by one or more navigation applications 214. For example, a search application has an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing, and attractive as possible, the marketplace applications 120 may include one or more imaging applications 216, which users may utilize to upload images for inclusion within listings. An imaging application 216 also operates to incorporate images within, viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-resisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide-feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the internet). Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Large-scale buyer applications 234, described in more detail below, may enable purchasers of large numbers of items (e.g., significantly more items than a typical purchaser) to manage their purchases with as little overhead as possible. For example, the large-scale buyer applications 234 may provide such large-scale purchasers with tools that, are not available to the typical buyer that, for example, make it easier for the large-scale purchasers to efficiently track their purchases or manage actions associated with their purchases.

Figure 3:
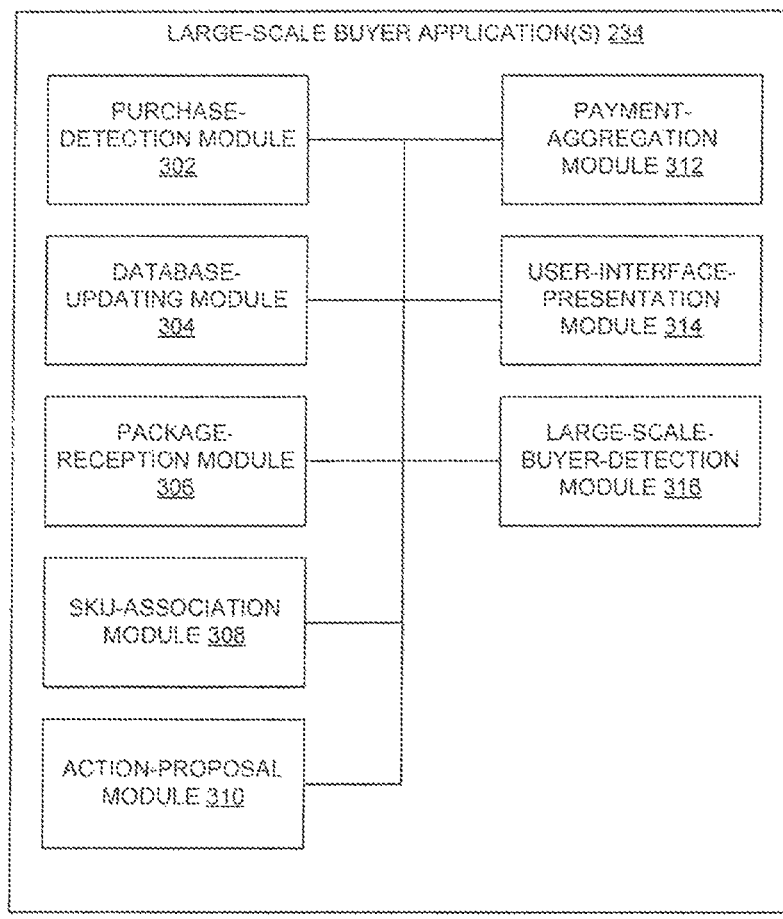
FIG. 3 is a block diagram, illustrating example modules of the large-scale buyer applications of FIG. 2.

FIG. 3 is a block diagram illustrating example modules of the large-scale buyer applications 234. A purchase-detection module 302 may be configured detect that a buyer has agreed to purchase an item (e.g., via the system 100). A database-updating module 304 may be configured to update a record in a database maintained by the networked system 102 based on, for example, the detecting of the purchasing of the item by the buyer, a detecting of a receiving by the buyer of a package containing the item, or other inputs. A package-reception module 306 may be configured to detect mat a buyer has received, a package containing an item that die buyer agreed to purchase. A stock-keeping unit (SKU) association module 308 may be configured to associate a SKU (e.g., as specified by the buyer) with the item. An action-proposal module 310 may be configured to propose various actions for a buyer with regard to items purchased or ordered (e.g., notify the buyer of deadlines pertaining to the opening of a dispute with respect to a purchased item or notify the buyer to fellow up with a seller from which an ordered item has not been received within a particular time period). A payment-aggregation module 312 that is configured to aggregate payments for multiple items (e.g., from multiple sellers) that the buyer has agreed to purchase. A user-interface-presentation module 314 may be configured to select or present a user interface for the buyer (e.g., based on whether the buyer is a large-scale buyer or a typical buyer). A large-scale-buyer-detection module 316 may be configured to detect whether a buyer is a large-scale buyer (e.g., a buyer that purchases a significantly larger number of items than a typical buyer).

Figure 4:
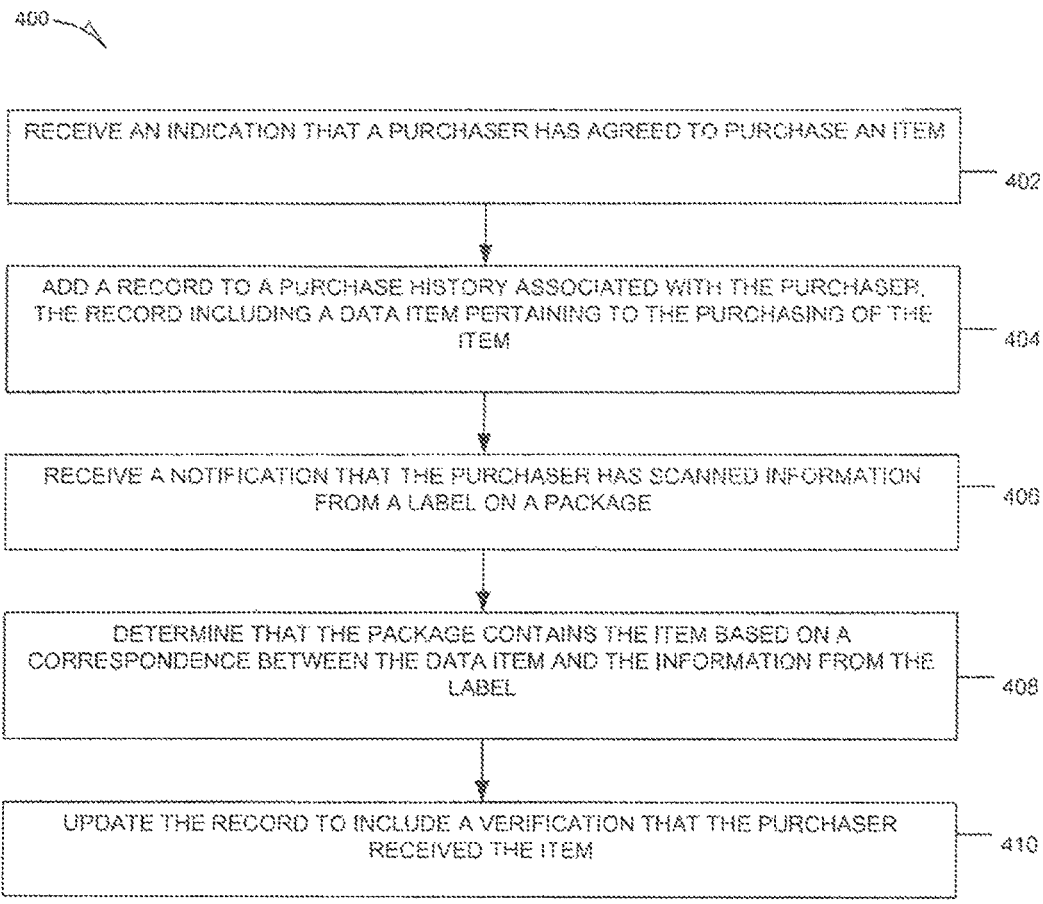
FIG. 4 is a flowchart illustrating an example method of tracking the purchasing and receiving of items offered for sale on the network-based publication system of FIG. 1.

FIG. 4 is a flowchart illustrating an example method 400 of tracking the purchasing and receiving of items offered for sale on the networked system 102. Various operations of the method 400 may be performed by the large-scale buyer applications 234. At operation 402, the purchase-detection module 302 detects that a purchaser has agreed to purchase an item. For example, the purchase-detection module 302 detects that the purchaser has entered a winning bid for the item in an auction on the networked system 102. Or the purchase-detection module 302 detects that the purchaser has agreed to pay a price for the item that a seller offered for an immediate ("Buy-It-Now") purchase of the item.

At operation 404, the database-updating module 304 adds a record to a purchase history associated with the purchaser that corresponds to the agreed-upon purchase. The record includes a data item pertaining to the purchasing of the item, such as an item number generated by the seller or the networked system 102.

At operation 406, the package-reception module 306 receives a notification that the purchaser has scanned information from a label on a package that the purchaser has received. The notification may include information contained on the label, such as the item number of an item contained in the package.

At operation 408, the package-reception module 306 determines that the package contains the item based on a correspondence between tire data item and the information from the label. In various embodiments, the label may be generated by the networked system 102 and affixed onto a package containing the hem by the seller of the item.

At operation 410, the database-updating module 304 updates the record to include a verification that the purchaser received the item. In this way, a large-scale purchaser, who potentially receives hundreds or thousands of packages per day, may access a purchase history (e.g., purchase records in one of database(s) 126 of the networked system 102) to easily perform a periodic (e.g., daily) reconciliation of items ordered versus items received.

For example, the user-interlace presentation module 314 may present information regarding items ordered versus items received (e.g., over a time period) such, that the purchaser may quickly determine which packages have not yet been received from various sellers. And, in various embodiments, because the determination of whether an item is received is based on a scanning of a label on a package containing the Item, the purchaser may perform the reconciliation without opening any packages. Furthermore, the user-interface presentation module 314 may present a user interface that enables the purchaser to quickly follow up with particular sellers regarding missing items or even open disputes with the sellers (e.g., via the dispute resolution application(s) 224). In various embodiments, when an item is not received by the purchaser within a predetermined time period (e.g., as specified by the purchaser in a profile he maintains with respect to the networked system 102), the action-proposal module 310 may propose that the purchaser contact the seller or, based on various factors (e.g., on the tardiness of the shipping of the item from the seller, the seller's reputation, and so on), open a dispute with the seller. The action-proposal module 310 may enable (e.g., via the user-interface presentation module 314) the purchaser to choose one of the proposed actions and then, in response, implement the action (e.g., by interfacing with the applications 120). Thus the purchaser may take immediate actions with respect to agreed-upon purchases at the moment such actions are proposed or deemed necessary by the networked system 102.

Figure 5:
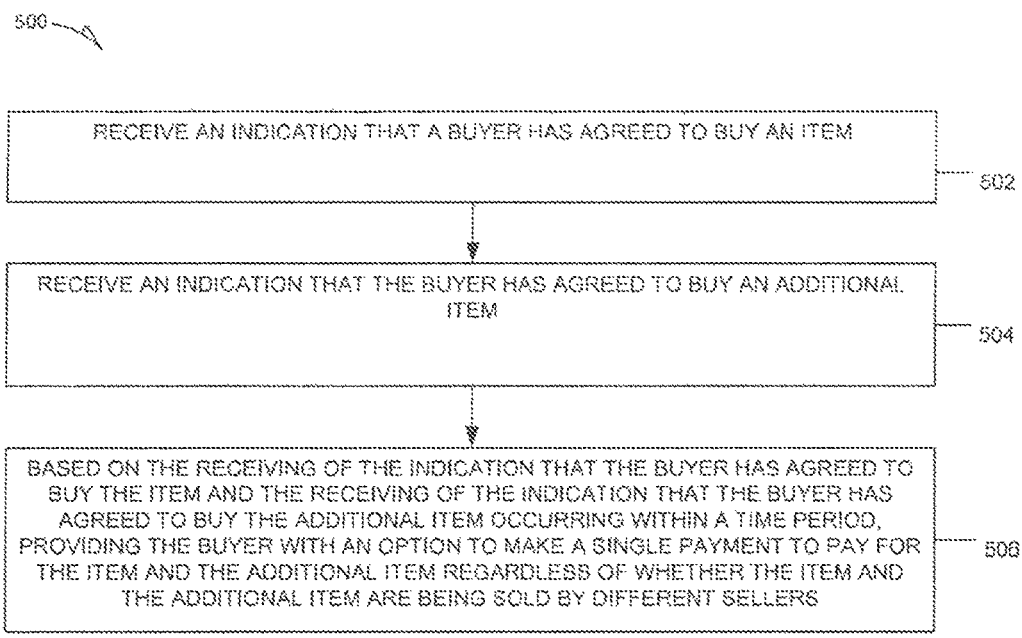
FIG. 5 is a flowchart illustrating an example method of enabling a purchaser to make a single payment to pay for multiple items that the purchaser has made agreements to purchase.

FIG. 5 is a flowchart illustrating an example method 500 of enabling a purchaser to make a single payment to pay for multiple items that the purchaser has made agreements to purchase (e.g., based on the time that elapses between the agreements). Various operations of the method 500 may be performed by the large-scale buyer applications 234.

At operation 502, the purchase-detection module 302 receives an indication that a purchaser has agreed to purchase an item. At operation 504, the purchase-detection module 302 receives an indication that the buyer has agreed to buy an additional item.

At operation 506, the payment-aggregation module 312 aggregates or consolidates the payments for the item and the additional item into a single payment. The payment-aggregation module 312 may perform the aggregation based on, for example, a length of time that elapses between when the purchaser agrees to purchase the first item and when the purchaser agrees to purchase the second hem. That is, the payment-aggregation module 312 may aggregate the payments if the length of time between the agreements does not transgress a threshold length of time. Or the payment-aggregation module 312 may, at a predetermined time or periodic interval of time (e.g., at 5:00 pm on weekdays), aggregate payments for agreements that the purchaser has made for which the purchaser has not yet made payments into a single payment. The payment-aggregation module 312 may then distribute the appropriate portions of the single payment to the appropriate sellers of each, item to which the single payment is directed.

The payments may be aggregated regardless of whether the seller of each item for which a payment is to be made are different sellers or the same seller. The user-interface-presentation module 314 may generate a user interface that lists all outstanding payments and enables the purchaser to select which payments are to be consolidated into a single payment. The user-interface-presentation module 314 may also enable the purchaser to configure groups of payments for outstanding purchases (e.g., how many groups of payments to make, which payments should be included in each group, or when a single payment for each group of payments should be made). Thus, the large-scale buyer applications 234 may enable a purchaser to, rather than attempt to manage making many (e.g., hundreds or thousands of payments) to each individual seller of items that the purchaser has agreed to purchase, make as little as a single payment to cover all of the agreements. Thus, a large-scale purchaser need not devote as many workers or other resources to managing payments.

Figure 6:
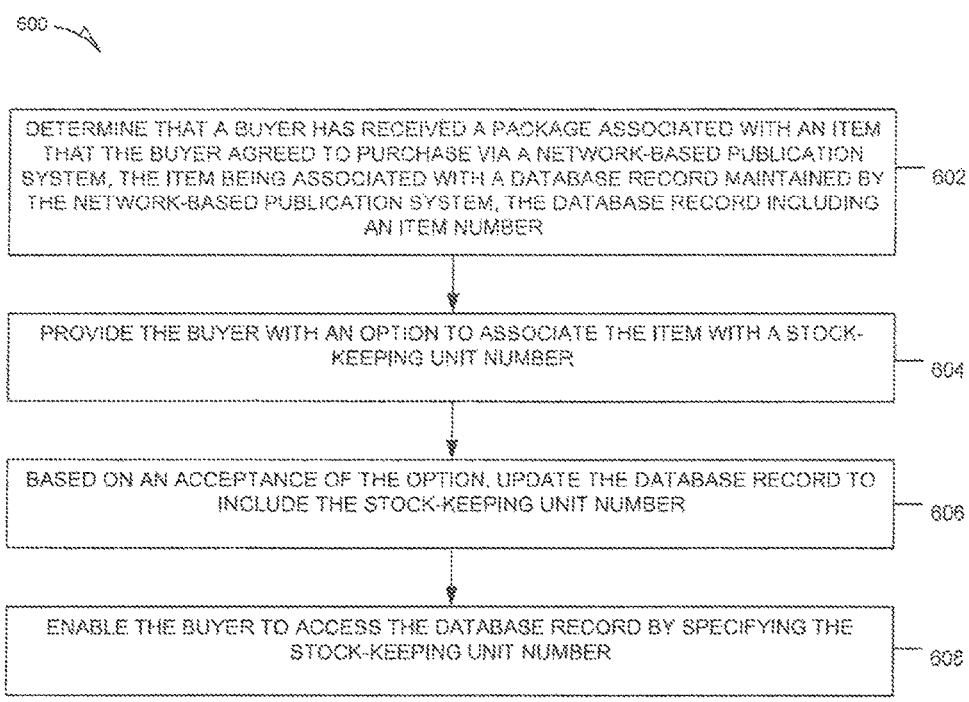
FIG. 6 is a flowchart illustrating an example method of enabling a buyer to use a stock-keeping unit (SKU) number to access a database-record containing information about a purchasing of an item.

FIG. 6 is a flowchart illustrating an example method 600 of enabling a buyer to use a stock-keeping unit (SKU) number to access a database record containing information about a purchase of an item with which the buyer associates the SKU. Various operations of the method 600 may be performed by the large-scale buyer applications 234. At operation 602, the package-reception module 306 determines that the buyer has received a package associated with an item that the buyer agreed to purchase via the networked system 102. For example, the package-reception module 306 may perform the steps described above with respect to FIG. 4. In various embodiments, the database record may include an item number for the item. The item number may be generated by the seller of the item (e.g., a 12-digit item number that appears on the invoice from the seller) or the networked system 102 and thus may not be particularly meaningful to the buyer.

At operation 604, the SKU-association module 308 provides the buyer with an option to associate the item with a SKU. For example, when the user scans a label on a package containing die item from a mobile device, the SKU-association module 308 may generate a user interface for presentation on the mobile device that prompts the user to enter a SKU for the item. The SKU may be a number that is proprietary to the buyer and thus not have any particular meaning to the seller or the networked system 102.

At operation 606 the database-updating module 304 updates a record in a database to include the SKU. For example, the database-updating module 304 may update a record corresponding to the purchase history of the buyer (and maintained with respect to the networked system 102) to include the SKU specified by the buyer.

At operation 608, the user-interface-presentation module 314 may generate a user interface that enables the user (e.g., a buyer) to access a database record by specifying the SKU. For example, the user-interface-presentation module 314 may generate a user interface that includes a search, box for searching for an item in a purchase history of the buyer. When the user enters the SKU in the search box, the SKU-association module 308 may identify the item corresponding to the SKU. The user-interface-presentation module 314 may then present information contained in the database record corresponding to the item to which the SKU has been linked.

By enabling buyers to associate such SKUs with items that they agree via the networked system 102 to purchase or receive, the large-scale buyer applications 234 make it easier for buyers to track their packages. Instead of having to learn to use item numbers or other identification data that is associated with items by the sellers or the networked system 102 buyers can use their own item identification data. Thus, the large-scale buyer applications 234 effectively enable buyers to synchronize database records stored on the networked system 102 with their own internal systems or record-keeping processes, and then access those database records using their own proprietary data.

Figure 7:
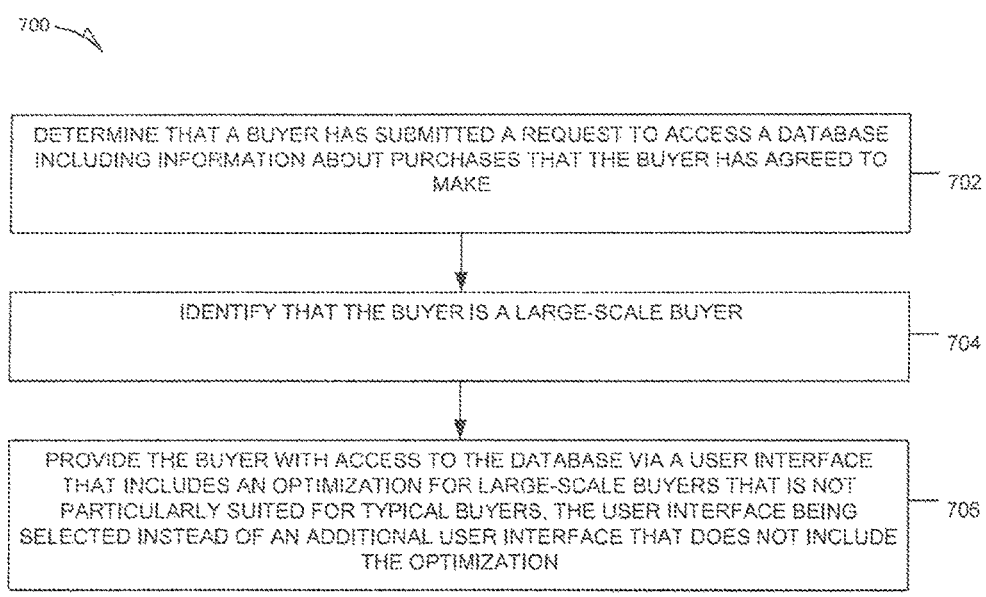
FIG. 7 is a flowchart illustrating an example method of including an optimization in a user-interface of the network-based publication system based on a determination, that a buyer is a large-scale buyer.

FIG. 7 is a flowchart illustrating an example method 700 of including an optimization in a user-interface of the network-based publication system based on a determination that a buyer is a large-scale buyer. Various operations of the method 700 may be performed by the large-scale buyer applications 234. At operation 702, the user-interlace presentation module 314 determines that a buyer has submitted a request to access a database that includes information about purchases that the buyer has agreed to make. For example, the user-interface presentation module 314 determines that the buyer wishes to view a history of the purchases he has made via the networked system 102 (e.g., by clicking on a "purchase history" link on a user interface presented by the networked system 102).

At operation 704, the large-scale-buyer-detection module 316 identifies the buyer as a large-scale buyer. For example, the large-scale-buyer-detection module 316 determines that the buyer has an average number of purchases over a time period (e.g., a day) that is more than an average number of purchases over the time period by a typical buyer. The large-scale-buyer-detection module 316 may determine that a number of records in a database corresponding to purchases made by the buyer over a time period has exceeded a number of records for which the user-interface-presentation module 314 can present information efficiently to the buyer via a particular user interface screen. For example, the large-scale-buyer-detection module 316 may determine that the buyer has made 25,000 purchases in the last six months and that the particular user interface screen (e.g., an HTML page) that is generated to display information about those purchases cannot be loaded by the buyer without the buyer experiencing significant delays while loading the user interface screen (e.g., a delay that exceeds a predetermined threshold determined by an administrator of the networked system 102 or a delay that is specified by the buyer in profile or preference data maintained by the buyer with respect to the networked system 102). Thus, the large-scale-buyer-detection module 316 may base the determination of whether a buyer is a large-scale buyer on performance metrics associated with the buyer's accessing of information maintained by the networked system 102 that pertains to items that the buyer has agreed to purchase.

At operation 706, the user-interface-presentation module 314 provides the buyer with access to the database via a user interface that includes an optimization for large-scale buyers. In various embodiments, the optimization is not particularly suited for typical buyers. For example, instead of presenting information, pertaining to all of the purchases of the buyer over a time frame specified by the buyer in a single list, the user interface may separate the information about the purchases into several navigable pages within the user interface. Or, instead of presenting substantially all of the data pertaining to each item in the corresponding list, the user interface may present a summary of the data pertaining to the items such that less information about the items is initially conveyed to the buyer but the page containing the data can be loaded by the buyer more quickly. Or, the user interface may include a search query box or other searching tools to enable the user to search through all of the items in the list instead of having to browse through all of the items included in the list. Or the user interface may include search boxes corresponding to one or more of the fields, such as the title or description fields, included in the database records maintained by the networked system 102 that pertain to purchases that the buyer has agreed to make.

Thus, the large-scale buyer applications 234 may provide user interface enhancements that make it easier for large-scale buyers to quickly access the information they are seeking from database records maintained by the networked system 102, such as records that match particular queries entered by the large-scale buyer with respect to purchases that the buyer has agreed to make. Such user interface enhancements may be a distraction to a typical buyer or may be features that a typical buyer would have very little use for (e.g., based on the typical buyer having far fewer purchases to track over particular time periods than a large-scale buyer).

Figure 8:
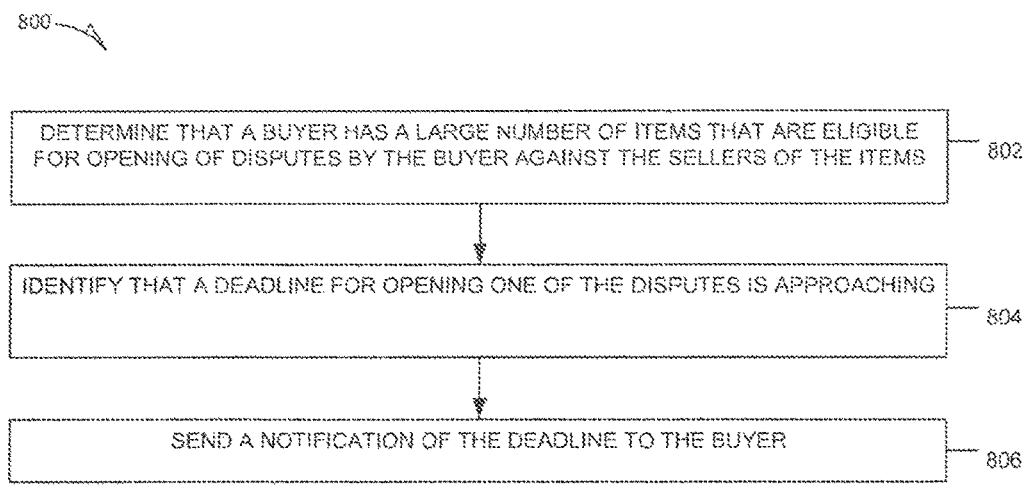
FIG. 8 is a flowchart illustrating an example method of notifying a large-scale buyer of a deadline for opening a dispute against a seller with respect to one of a plurality of items that the buyer has agreed to purchase.

FIG. 8 is a flowchart illustrating an example method 800 of notifying a large-scale buyer of a deadline for opening a dispute against a seller with respect to one of a plurality of items that the buyer has agreed to purchase. At operation 802, the large-scale-buyer-detection module 316 determines that the buyer has a large number of items that are eligible for opening of disputes by the buyer against the sellers of the items. For example, the large-scale-buyer-detection module 316 determines that the buyer is a large-scale buyer.

At operation 804, the action-proposal module 310 identifies that a deadline for opening one of the disputes is approaching. For example, if the buyer made a payment for the item using a particular payment processing system (e.g., a credit card), the action-proposal module 310 may determine that the deadline is approaching based on an analysis of the purchase-agreement date, a deadline specified in a policy of the payment processing system, and the current date. For example, if the deadline for opening a dispute with the payment processor is within a time period specified by the buyer in preference data or by an administrator of the networked system 102 (e.g., one week), the action-proposal module 310 may determine that the deadline is imminent.

At operation 806, the action-proposal module 310 may send a notification of the deadline to the buyer. The notification may include an option for the buyer to take an action with respect to the notification (e.g., open a dispute with a payment processor that the buyer used to complete the transaction or another entity, such as the networked system 102, that governs fraud associated with the transaction). The user-interface-presentation module 314 may generate a user interface that includes dispute information pertaining to all or a subset of the Items that the buyer has agreed to purchase or for which the buyer has made a payment, including actions that the user may make with respect to the dispute process (e.g., opening a dispute, closing a dispute, replying to statements made by the seller, and so on). The user interface may include a summary of the status of the dispute resolution process for each item, such as the information about items for which the dispute resolution is available (e.g., for which the final deadline for opening a dispute has not passed), information about items for which the dispute resolution process is no longer available, or information about items far which the dispute resolution is in progress (e.g., when the dispute was opened, when a next action must be taken, and so on).

The user interface may sort items for which the dispute resolution process is still available by the number of days until a deadline by which an action must be taken to open the dispute, escalate the dispute, respond to a seller, or otherwise keep the dispute alive. Thus, the large-scale buyer applications 234 may not only enable buyers to understand their rights with respect to each purchase that they have made, but also enable the buyers to take appropriate actions at the appropriate times to protect those rights. The user interface for notifying the buyers of upcoming deadlines related to dispute resolution may be tightly integrated with the dispute resolution application(s) 224 described above.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically, for example, a hardware module may comprise dedicated circuitry or logic that is permanently configured (e.g., as a special-purpose processor, such as a field programmable gate array (FPGA) or an application-specific integrated circuit (ASIC)) to perform, certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or In temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform, certain operations described herein. Considering, embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information fern, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or mom operations or functions. Tire modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among, the one or more processors, not only-residing within a single machine, but deployed across a number of machines, in some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 164 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be perforated by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication, network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
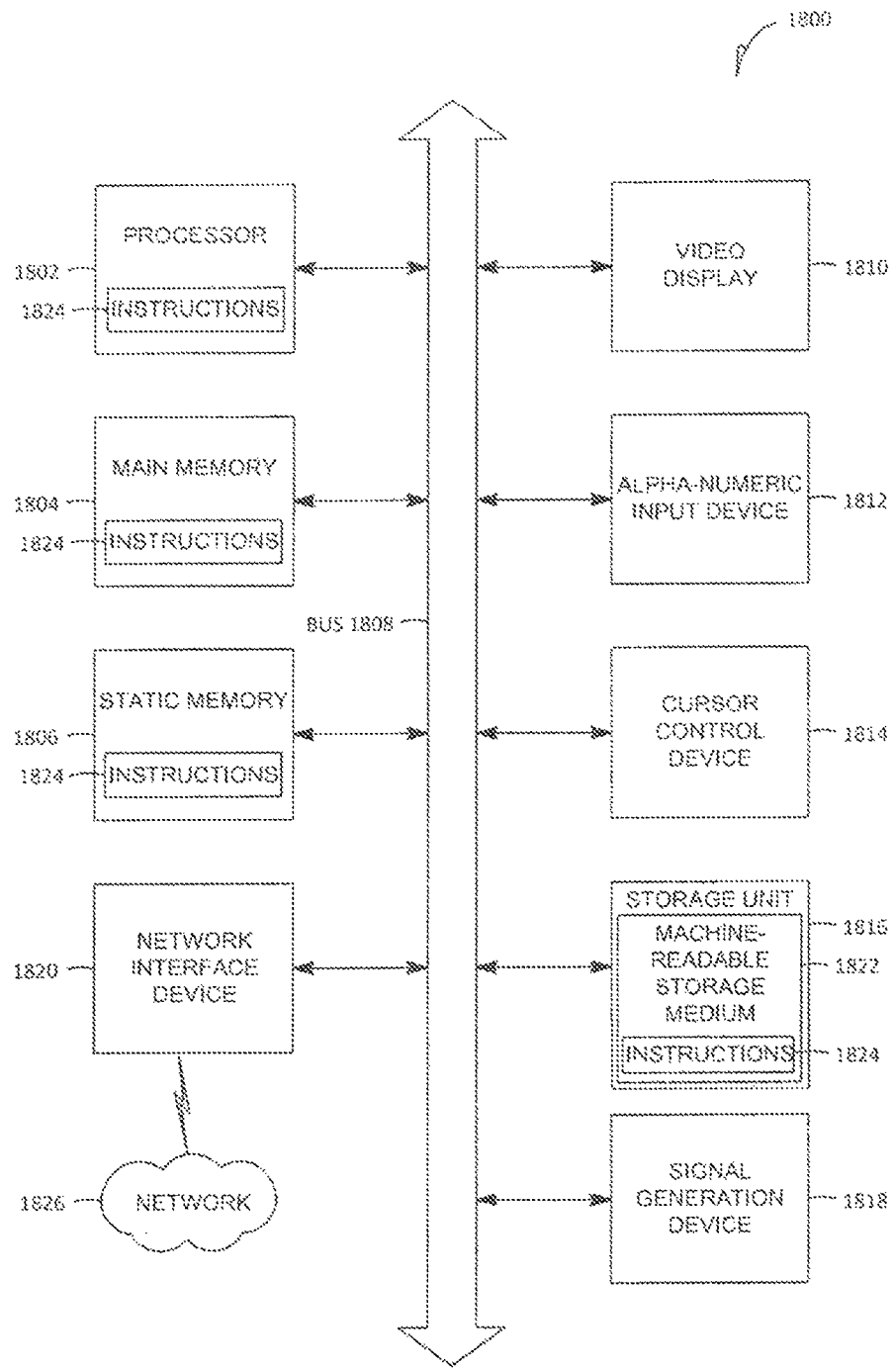
FIG. 9 is a block diagram of machine in the example form of a computer system within which, instructions for causing the machine to perform any one or more of the methodologies discussed herein may be executed.

FIG. 9 is a block diagram of machine in the example form of a computer system 1800 within, which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage taut 1816 includes a machine-readable medium 1822 on which is stored one or more sets of data structures and instructions 1824 (e.g., software) embodying or utilized, by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting, machine-readable media. The instructions 1824 may also reside, completely or at least partially, within the static memory 1806.

While the machine-mad able medium 1822 is shown in an example embodiment to be a single medium, the terra "machine-readable medium" may include a single medium, or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile, memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, tire Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of sued software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may foe utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application, to any single invention or inventive concept if more than one is in feet disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
incorporating one or more modules into a networked system, the one or more modules configuring one or more processors of the networked system to perform operations for using a selected user interface of a plurality of user interfaces for presenting a purchase history associated with a purchaser, the purchase history stored in a database of a networked system, the operations including:
  receiving an indication at the networked system that the purchaser has agreed to purchase an item;
  adding a record to the purchase history, the record including a data item pertaining to the purchasing of the item;
  receiving a request at the networked system to view the purchase history;
  determining that a delay would result from presenting the purchase history using a second user interface of the plurality of user interfaces instead of a first user interface of the plurality of user interfaces, the determining based on a detection that an optimization for a large-scale buyer is not included in the second user interface;
  based on the determining, choosing the first user interface instead of the second user interface as the selected user interface; and
  communicating the selected user interface for presentation on the client device.

2. The method of claim 1, further comprising:
receiving an indication that the purchaser has agreed to purchase an additional item; and
based on the receiving of the indication that the purchaser has agreed to purchase the item and the receiving of the indication that the purchaser has agreed to purchase an additional item occurring within a time period, providing the purchaser with an option in the first user interface to make a single payment to pay for the item and the additional item.

3. The method of claim 1, further comprising:
receiving a notification that the purchaser has scanned information from a label on a package;
determining that the package contains the item based on a correspondence between the data item and the information from the label;
updating the record to include a verification that the purchaser received the item; and
based on the determining that the package contains the item, generating a reminder that includes a deadline for opening a dispute against a seller of the item.

4. The method of claim 3, wherein the information on the label is an item number that is different from a stock-keeping-unit number that the purchaser has associated with the item.

5. The method of claim 4, further comprising:
in response to determining that the package contains the item, providing the purchaser with an option to specify the stock-keeping-unit number; and
based on an acceptance by the purchaser of the option, updating the record to include the stock-keeping-unit number.

6. The method of claim 1, wherein the optimization allows the purchaser to search for a record based on the stock-keeping-unit number instead of the item number.

7. The method of claim 1, wherein the optimization includes presenting a summary of the data in records in the purchase history instead of substantially all of the data in the records such that a delay that would result from presenting the purchase history in the first user interface is less than the delay that would result from presenting the purchase history in the second user interface.

8. The method of claim 1, wherein the optimization includes providing search tools to allow the purchaser to search the purchase history instead of browse the search history, the search tools allowing the purchaser to search the purchase history using search boxes corresponding to one or more fields in records of the purchase history.

9. The method of claim 8, wherein the determining that the delay would result from presenting the purchase history using the second user interface is based on a number of records in the purchase history exceeding a number of records that can be presented efficiently via the second user interface.

10. A system comprising:
one or more processors;
one or more modules implemented by the one or more processors and configured to, at least:
  receive an indication at a networked system that a purchaser has agreed to purchase an item;
  add a record to a purchase history associated with the purchaser, the record including a data item pertaining to the purchasing of the item, the purchase history stored in a database of a networked system;
  receive a request at the networked system to view the purchase history;
  determine that a delay would result from presenting the purchase history using a second-user interface of the plurality of user interfaces instead of a first user interface of the plurality of user interfaces, the determining based on a detection that an optimization for a large-scale buyer is not included in the second user interface;
  based on the determining, choose the first user interface instead of the second user interface as the selected user interface; and
  communicate the selected user interface for presentation on the client device.

11. The system of claim 10, wherein the processor-implemented module is further configured to:
- receive an indication that the purchaser has agreed to purchase an additional item; and
- based on the receiving of the indication that the purchaser has agreed to purchase the item and the receiving of the indication that the purchaser has agreed to purchase the additional item occurring within a time period, provide the purchaser with an option in the first user interface to make a single payment to pay for the item and the additional item.

12. The system of claim 10, wherein the processor-implemented module is further configured to:
- receive a notification that the purchaser has scanned information from a label on a package;
- determine that the package contains the item based on a correspondence between the data item and the information from the label;
- update the record to include a verification that the purchaser received the item; and
- based on the determining that the package contains the item, generate a reminder that includes a deadline for opening a dispute against a seller of the item.

13. The system of claim 12, wherein the information on the label is an item number that is different from a stock-keeping-unit number that the purchaser has associated with the item.

14. The system of claim 13, wherein the processor-implemented module is further configured to:
- in response to determining that the package contains the item, provide the purchaser with an option to specify the stock-keeping-unit number; and
- based on an acceptance by the purchaser of the option, update the record to include the stock-keeping-unit number.

15. The system of claim 10, wherein the optimization allows the purchaser to search for a record based on the stock-keeping-unit number instead of the item number.

16. A non-transitory machine readable medium embodying a set of instructions that, when executed by one or more processors, causes the one or more processors to perform operations comprising:
- receiving an indication at a networked system that a purchaser has agreed to purchase an item;
- adding a record to a purchase history associated with the purchaser, the record including a data item pertaining to the purchasing of the item, the purchase history stored in a database of a networked system;
- receiving a request at the networked system to view the purchase history;
- determining that a delay would result from presenting the purchase history using a second user interface of the plurality of user interfaces instead of a first user interface of the plurality of user interfaces, the determining based on a detection that an optimization for a large-scale buyer is not included in the second user interface;
- based on the determining, choosing the first user interface instead of the second user interface as the selected user interface; and
- communicating the selected user interface for presentation on the client device.

17. The non-transitory machine readable medium of claim 16, wherein the operations further comprise:
- receiving an indication that the purchaser has agreed to purchase an additional item; and
- based on the receiving of the indication that the purchaser has agreed to purchase the item and the receiving of the indication that the purchaser has agreed to purchase the additional item occurring within a time period, providing the purchaser with an option in the first user interface to make a single payment to pay for the item and the additional item.

18. The non-transitory machine readable medium of claim 16, wherein the operations further comprise:
- receiving a notification that the purchaser has scanned information from a label on a package;
- determining that the package contains the item based on a correspondence between the data item and the information from the label;
- updating the record to include a verification that the purchaser received the item; and
- based on the determining that the package contains the item, generating a reminder that includes a deadline for opening a dispute against a seller of the item.

19. The non-transitory machine readable medium of claim 18, wherein the information on the label is an item number that is different from a stock-keeping-unit number that the purchaser has associated with the item.

20. The non-transitory machine readable medium of claim 19, wherein the operations further comprise:
- in response to determining that the package contains the item, providing the purchaser with an option to specify the stock-keeping-unit number; and
- based on an acceptance by the purchaser of the option, updating the record to include the stock-keeping-unit number.

* * * * *